(12) United States Patent  
Tamura et al.

(10) Patent No.: US 7,470,925 B2  
(45) Date of Patent: Dec. 30, 2008

(54) MAGNETIC BODY, MAGNETIC DEVICE USING THE SAME, AND METHOD OF MANUFACTURING THE SAME

(75) Inventors: Hiroyuki Tamura, Sagamihara (JP); Hideaki Takayanagi, Sagamihara (JP)

(73) Assignee: Nippon Telegraph and Telephone Corporation (JP)

( * ) Notice: Subject to any disclaimer, the term of this patent is extended or adjusted under 35 U.S.C. 154(b) by 669 days.

(21) Appl. No.: 10/654,306

(22) Filed: Sep. 2, 2003

(65) Prior Publication Data

US 2004/0042266 A1 Mar. 4, 2004

(30) Foreign Application Priority Data

Aug. 30, 2002 (JP) ............................ P2002-256036

(51) Int. Cl.
*H01L 29/06* (2006.01)
(52) U.S. Cl. .................... 257/9; 257/E43.001; 977/932
(58) Field of Classification Search ...................... 257/9
See application file for complete search history.

(56) References Cited

U.S. PATENT DOCUMENTS

2001/0007718 A1 7/2001 Tamura et al.

FOREIGN PATENT DOCUMENTS

JP 2001-257394 9/2001

OTHER PUBLICATIONS

Tamura et al. "Flat-band Ferro magnetism in quantum dot supperlattices," Phys. Rev. B vol. 65 p. 085324-1, Feb. 2002.*

Akira Sugimura, "Possibility of Magnetic Ordered States in Semiconductor Quantum Dot System", Japanese Journal of Applied Physics, vol. 29, No. 12, Dec. 1990, pp. L2463-L2465, XP-002373488.

Khurgin J. B. et al. "Exchange interactions in strained quantum dot arrays and possibility of engineering their magnetic properties", Superlattices and Microstructures, Academic Press, London, GB, vol. 24, No. 2, Aug. 1998, pp. 133-142, XP004445309, ISSN: 0749-6038.

J. Kolehmainen, S.M. Reimann, M. Koskinen, M. Manninen, "Magnetic interaction between coupled quantum dots", The European Physical Journal B, vol. 13, No. 4, Feb. 2000, pp. 731-736, XP-002373487.

Mano T. et al., "Formation of InAs quantum dot arrays on GaAs (100) by self-organized anisotropic strain engineering of a (In, Ga) As superlattice template", Applied Physics Letters, AIP, American Institute of Physics, Melville, NY, US, vol. 81, No. 9, Aug. 28, 2002, pp. 1705-1707, XP012033393, ISSN: 0003-6951.

Hill R. J. A. et al., "Magnetotunneling spectroscopy of an individual quantum dot in a gated tunnel diode", Applied Physics Letters, AIP, American Institute of Physics, Melville, NY, US, vol. 79, No. 20, Nov. 12, 2001, pp. 3275-3277, XP012029416, ISSN: 0003-6951.

(Continued)

*Primary Examiner*—Jack Chen
*Assistant Examiner*—Matthew Reames
(74) *Attorney, Agent, or Firm*—Kilpatrick Stockton LLP (57) ABSTRACT

A magnetic body composed of non-magnetic material, includes a plurality of localized electron regions in each of which at least one electron is confined to form a localized spin, a barrier potential region having a higher energy than a Fermi energy of an electron in the localized electron region and permitting an electron to be confined in the respective localized electron regions, and a conductive electron region including a conductive electron system having a lower energy than an energy of the barrier potential region, wherein the respective localized electron regions are disposed separate from one another via the barrier potential region and the conductive electron region.

9 Claims, 8 Drawing Sheets

OTHER PUBLICATIONS

N. Aoki, L.H. Lin, Y. Ochiai, K. Ishibashi, Y. Aoyagi, J.P. Bird, D.K. Ferry, J. Oswald, "Magneto-conductance in dot array system at high-magnetic fields", Physica E, vol. 13, No. 2-4, Mar. 2002, pp. 769-772, XP2374127.

Oda, S. et al., "Nanocrystalline Silicon Quantum Dots Prepared by VHF Plasma-enhanced Chemical Vapor Deposition", *J. Phys. IV*, France 11, pp. Pr3-1065-Pr3-1071 (2001).

Ueno, K., et al., "Fabrication of GaAs Quantum Dots on a Bilayer-GaSe Terminated Si(111) Substrate", *Jpn. J. Appl. Phys.*, vol. 40, Part 1, No. 3B, pp. 1888-1891 (2001).

Van der Wiel, W.G., et al., "The Kondo Effect in the Unitary Limit", *Science*, vol. 289, pp. 2105-2108 (2000).

H. Tamura et al., "Tunable Exchange Interaction in Quantum Dot Devices", Japanese Journal of Applied Physics, vol. 43, No. 5B, pp. L691-L693, Apr. 28, 2004.

S. Sasaki et al., "Nonlocal Control of the Kondo Effect in a Double Quantum Dot-quantum Wire Coupled System", Physical Review B 73, pp. 161303-1:161303-4, Apr. 20, 2006.

N.J. Craig et al., "Tunable Nonlocal Spin Control in a Coupled-Quantum Dot System", Science, vol. 304, pp. 565-567, Apr. 23, 2004.

* cited by examiner

MAGNETIC BODY, MAGNETIC DEVICE USING THE SAME, AND METHOD OF MANUFACTURING THE SAME

CROSS REFERENCE TO RELATED APPLICATION

This application claims benefit of priority under 35 U. S. C. § 119 to Japanese Patent Application No. 2002-256036, filed on Aug. 30, 2002, the entire contents of which are incorporated by reference herein.

BACKGROUND OF THE INVENTION

1. Field of the Invention

The present invention relates to a magnetic body, a magnetic device using the same, and a method of manufacturing the same.

2. Description of the Related Art

Conventionally, magnetic memory media and magnetic sensors have been produced from magnetic bodies made from magnetic materials such as natural magnets (e.g., magnetite; $Fe_3O_4$), alloy magnets (e.g., chrome steel and high cobalt steel), magnets composed of alnico, ferrite and a rare earthes, and more.

Since all of these magnetic materials include magnetic metals, production processes of these magnetic materials, e.g., manufacturing process of a magnetic device on an LSI (Large Scale Integration) substrate using semiconductors such as silicon and gallium arsenate (GaAs), have various issues such as a poor bonding property between adjacent substances.

Therefore, individual circuits have to be formed as separate component parts different from electronic components, such as transistors, formed on the LSI substrate. As the result, a serious obstacle to miniaturization, high integration and reduction in production steps of an electronic circuitry exists.

In the meanwhile, since a semiconductor cluster, a carbon cluster, and a metallic cluster chemically synthesized from non-magnetic materials have no magnetism, mere assemble of these components could not make magnetic materials.

In order to address such an issue, attempts have heretofore been undertaken to fabricate the magnetic body made from non-magnetic materials having flat-band structure. The "flat-band structure" means a band structure with no dependent on a wave number in energy dispersion of electrons. Lieb and Mielke have theoretically shown that materials having the flat-band structure emerge ferromagnetism. The Leib and Mielke theories suggest that charging the electrons into a non-dispersion (that is, a strongly degenerate) system such as the flat-band causes spins of the electrons to be aligned in parallel as much as possible.

In general, when the electrons are filled in a degenerated energy level, the spins are influenced to be oriented in same (parallel) direction as much as possible in order to gain an exchange energy. A typical example of this effect is the Hund first rule in a field of an atomic nucleus model. Their theories show that the same effect is obtained in material having the flat-band structure.

On the basis of their theories, Japanese Patent Application No. 2001-257394 has proposed a magnetic body made from non-magnetic materials such as graphite, gallium (Ga) atoms and arsenate (As) atoms.

This technology contemplates forming quantum dot arrays, placed with a plurality of quantum dots each of which has a periphery formed with a high energy potential region to allow the electrons to be trapped, on particular lattice points used in their theories, such that the electrons are enabled to directly transfer between adjacent quantum dots to realize the flat-band structure to allow ferromagnetism to be generated.

The quantum dot array is an artificially formed crystal, so-called artificial crystal when a quantum dot is regarded as an artificial atom. Due to development of the processing technology in recent years, there has been progressively an increasing capability of manufacturing such an artificial crystal and, in respect of so-called artificial molecules where two quantum dots are bonded, ferromagnetic states with the spins oriented in the same (parallel) direction has been already experimentally realized.

SUMMARY OF THE INVENTION

However, in order for a further large number of quantum dots to be bonded to one another to cause ferromagnetism to be generated in the artificial crystal, the quantum dots scaled in the same size must be periodically arranged in a certain particular lattice structure and, hence, an issue arises in that a high level of processing, synthesis and arranging technology must be required.

Further, in order for the artificial crystal to be used as a real device, ferromagnetism transition temperature needs to be raised up to room temperature. To this end, although the size of the quantum dots must be less than approximately 10 nm, a technical issue arises in a status quo in periodically arranging the quantum dots scaled in such a small size.

The present invention has been completed in view of the above difficulties and has an object to provide a magnetic body, made from non-magnetic material, that allows quantum dot system, surrounded by barrier layers, to be bonded to one another through a conductive electron region to show ferromagnetism even at room temperature and that can be easily manufactured. A further object is to provide a magnetic device using such a magnetic body and a method of manufacturing the magnetic body.

To achieve the above object, according to a first aspect of the present invention, there is provided a magnetic body composed of non-magnetic material, comprising a plurality of localized electron regions in each of which at least one electron is confined to form a localized spin, a barrier potential region having a higher energy than a Fermi energy of electrons in the respective localized electron regions and confining electrons within the respective localized electron regions, and a conductive electron region including a conductive electron system having a lower energy than an energy of the barrier potential region, wherein the respective localized electron regions are disposed separate from one another via the barrier potential region and the conductive electron region to show ferromagnetism based on an interaction between localized spins through the conductive electron region.

A second aspect of the present invention is a magnetic device that comprises a magnetic body of the first aspect, an insulation layer, and a gate electrode disposed in close proximity to a conductive electron region of the magnetic body through the insulation layer, wherein application of a voltage to the gate electrode allows a ferromagnetic condition of the magnetic body to be controllably turned on or turned off.

A third aspect of the present invention contemplates growing semiconductor material on a conductive electron region through a barrier potential layer in a self-organizing capability such that a center-to-center distance between the nearest quantum dots is at most $1/\pi$ times a Fermi wave length of a conductive electron.

DETAILED DESCRIPTION OF THE PREFERRED EMBODIMENTS

Now, a best mode for carrying out the present invention is described with reference to the drawings.

(Theoretical Background)

Initially, we explain a theoretical background so as to propose a magnetic body of the preferred embodiments of the present invention. Hereinafter, as a theoretical model of the present invention, we consider a non-magnetic material that includes a plurality of localized electron regions (quantum dots) in each of which at least one electron is confined, a barrier potential region (a potential barrier) each having a higher potential energy than a Fermi energy of electrons in the respective localized electron regions, and a conductive electron region (a conductive electron system) having a lower energy than an energy of the barrier potential region.

Here, the "quantum dot" means a physical structure that the electron is confined in a nano-scaled region by the barrier potential to constrain the motion of the electron to become zero degree of freedom.

First, we consider a situation where one quantum dot is coupled with conductive electrons in three-dimensional and two-dimensional conductive electron region, and we suppose that an odd number of 2n+1 (wherein n represents 0 or a positive integer number) electrons are confined in the quantum dot.

The electron has a quantum angular momentum, called spin, that is oriented upward ($S=\frac{1}{2}$) or downward ($S=-\frac{1}{2}$), and a total spin of 2n +1 electrons within the quantum dot is given by a sum of individual spins. The total spin is coupled with conductive electrons in the conductive electron system, through interaction (exchange interaction). If an energy level within the quantum dot does not degenerate, up-spins (n/2) and down-spins (−n/2) cancel each other, except for only one electron-spin (½).

In the following description, we suppose that the conductive electron system includes a lattice array in which each of lattice points with a volume v are arranged, and a volume N v of this lattice array is designated as V.

Assuming the quantum dot located the origin in a coordinate, the exchange interaction Hamiltonian $H_{exch}$ between a remaining spin (localized spin) and the conductive electron system is generally described as $$H_{exch} = -2Jv \sum_j \delta(r_j)(s_j \cdot S) \qquad (1)$$
$$= -\frac{2J}{N} \sum_q e^{-iq \cdot r_j}(s_j \cdot S),$$

where J is an exchange integral (exchange energy), $r_j$ and $s_j$ respectively represent a position and a spin of a j-th conductive electron, S is an angular momentum of the total spin of the electrons within the quantum dot, $\delta(r_j)$ is the Dirac δ-function, and q is the wave number vector.

In this case, the exchange energy is estimated, within a second-order perturbation theory based on the exchange interaction Hamiltonian $H_{exch}$, as follows:

$$J = -N|V_{k_F,d}|^2 \left( \frac{1}{E_d + U} - \frac{1}{E_d} \right), \qquad (2)$$

where $V_{k_F,d}$ represents the coupling strength between a orbit localized in the quantum dot and the conductive electron, $E_d$ and U represent an energy level and a Coulomb energy of the quantum-dot localized orbit, respectively.

Now, taking the direction z of the coordinate axis to be an orientation of the spin of the quantum dot, the equation (1) is equivalent to the Hamiltonian of the Zeeman splitting energy when applied with an external magnetic field described as $$H_q = \frac{2J}{g\mu_B N} S_z,$$

where $\mu_B$ represents the Bohr magneton.

The magnetic momentum density σ(r) of the conductive electron placed under such a magnetic field for the quantum dot located at the origin can be derived, within a first-order perturbation based on an hyper-fine structure Hamiltonian $H_q$, as follows:

$$\sigma(r) = \frac{1}{V} \sum_q e^{iq \cdot r} \chi(q) H_q, \tag{3}$$

$$\chi(q) = \left(\frac{g\mu_B}{2}\right)^2 \frac{2}{V} \sum_k \frac{f(k) - f(k+q)}{\varepsilon(k+q) - \varepsilon(k)}, \tag{4}$$

where ε(k) is the free electron energy, g is the g-factor of the electron, and f(k) is the Fermi distribution function.

Integrating the equations (3) and (4) at a continuous limit of the sum in these equations, the magnetic momentum densities a $\sigma_{3D}$ and a $\sigma_{2D}$ of the conductive electrons in the conductive electron system in the three-dimension (3D) and two-dimension (2D) rewritten as the following equations, respectively.

$$\sigma_{3D}(r) = \frac{12\pi}{V} \frac{N_e}{N} \frac{J}{g\mu_B} S_z \chi_{Pauli} F_{3D}(2k_F|r|), \tag{5a}$$

$$\sigma_{2D}(r) = \frac{32\pi}{3V} \frac{N_e}{N} \frac{J}{g\mu_B} S_z \chi_{Pauli} F_{2D}(2k_F|r|), \tag{5b}$$

where $F_{3D}(x)$, $F_{2D}(x)$ are respectively described as $$F_{3D}(x) = \frac{-x\cos x + \sin x}{x^4},$$

$$F_{2D}(x) = J_0(x/2) N_0(x/2) + J_1(x/2) N_1(x/2),$$

where $N_e$ is the total number of conductive electrons, $\chi_{Pauli} = 3N_e (g\mu_B)^2 / 8E_F$ is the Pauli's paramagnetic susceptibility, $k_F$ and $E_F$ represent the Fermi wave number and Fermi energy of respective free electrons, and $J_n$ and $N_n$ (n=0, 1) are the first and second kinds of n-order Bessel functions.

In the above description, we consider only the interaction between the one quantum dot and the conductive electron system. Hereinafter, we consider a more general situation where there are N quantum dots (N is a positive integer).

Assuming that the positions of the two quantum dots lie at $R_l$, $R_m$ (l<m), the magnetic momentum density of the conductive electron is formed around the quantum dot lying at the position $R_l$, based on the equation (3). As the result, the magnetic momentum density has an effect on a direction of the spin of the quantum dot lying at the position $R_m$.

Such interaction between the localized spins through the conductive electron system is generally referred to as "Ruderman-Kittel-Kasuya-Yoshida (RKKY) interaction". The Hamiltonian in the RKKY interaction is calculated as the second-order perturbation and is given, for the three-dimension (3D) and two-dimension (2D) cases, by $$H_{RKKY}^{3D} = -2Jv \sum_{l<m \leq N} \left\{ \frac{1}{g\mu_B} \sigma_{3D}(|R_l - R_m|) \right\} S_{mz} \tag{6a}$$

$$= -9\pi \frac{J^2}{E_F} \left(\frac{N_e}{N}\right)^2 \sum_{l<m \leq N} F_{3D}(2k_F|R_l - R_m|) S_{lz} S_{mz},$$

$$H_{RKKY}^{2D} = -2Jv \sum_{l<m \leq N} \left\{ \frac{1}{g\mu_B} \sigma_{2D}(|R_l - R_m|) \right\} S_{mz} \tag{6b}$$

$$= -8\pi \frac{J^2}{E_F} \left(\frac{N_e}{N}\right)^2 \sum_{l<m \leq N} F_{2D}(2k_F|R_l - R_m|) S_{lz} S_{mz}.$$

where the direction z of the coordinate axis is assigned as the orientation of the spin in the quantum dot (where $S_{lz}$ and $S_{mz}$ are the angular momentums of the total spin in the direction z of the respective quantum dots).

Physical features of the RKKY interaction are characterized by a tem of interaction between a pair of the l-th and m-th quantum dots. The strength of the RKKY interaction decays very fast, oscillating between positive and negative signs, when the distance between two dots is larger than the Fermi wave length. Therefore, it is sufficient to consider only terms between the nearest-neighboring dots expressed in the following equations:

$$H_{RKKY}^{3D} = -2Jv \left\{ \frac{1}{g\mu_B} \sigma_{3D}(|R_l - R_m|) \right\} S_{mz} \tag{7a}$$

$$= -9\pi \frac{J^2}{E_F} \left(\frac{N_e}{N}\right)^2 F_{3D}(2k_F|R_l - R_m|) S_{lz} S_{mz},$$

$$H_{RKKY}^{2D} = -2Jv \left\{ \frac{1}{g\mu_B} \sigma_{2D}(|R_l - R_m|) \right\} S_{mz} \tag{7b}$$

$$= -8\pi \frac{J^2}{E_F} \left(\frac{N_e}{N}\right)^2 F_{2D}(2k_F|R_l - R_m|) S_{lz} S_{mz},$$

where l, m represent the nearest two quantum dots. In the following description, the center-to-center distance $|R_l - R_m|$ between the nearest two quantum dots is designated at R.

Next, we further calculate the exchange energies represented by the equations (7a) and (7b) so as to obtain the ferromagnetic transition temperature. Substituting the equations (2) and (5a), (5b) into J of the equations (7a), (7b) exchange energies in case of the three-dimension and the two-dimension are estimated as $$J_{RKKY}^{3D}(R) = 9\pi \frac{J^2}{E_F} \left(\frac{N_e}{N}\right)^2 F_{3D}(2k_F R) \tag{8a}$$

$$= 16\pi E_F \left\{ \frac{\Gamma U}{\pi E_d (E_d + U)} \right\}^2 F_{3D}(2k_F R),$$

$$J_{RKKY}^{2D}(R) = 8\pi \frac{J^2}{E_F} \left(\frac{N_e}{N}\right)^2 F_{2D}(2k_F R) \tag{8b}$$

$$= 32\pi E_F \left\{ \frac{\Gamma U}{\pi E_d (E_d + U)} \right\}^2 F_{2D}(2k_F R),$$

where $\Gamma = \pi D_0 |V_{k_F,d}|^2$ (where $D_0$ represents the density of state of the conductive electron) is the elastic coupling energy between the conductive electron on the Fermi surface and the electron within the quantum dot.

When there is one excess electron inside the quantum dot and, the Fermi energy ($E_F=0$) lies in the center between $E_d+U$ and $E_d$, that is, $E_d=-U/2$, then the equations (8a) and (8b) are respectively written as $$J_{RKKY}^{3D}(R) = 256\pi E_F \left\{\frac{\Gamma}{\pi U}\right\}^2 F_{3D}(2k_F R), \qquad (9a)$$

$$J_{RKKY}^{2D}(R) = 512\pi E_F \left\{\frac{\Gamma}{\pi U}\right\}^2 F_{2D}(2k_F R), \qquad (9b)$$

where the exchange energies take the minimum values.

Here, we have assumed $E_d = -U/2$ to drive equations (9a) and (9b). Since the dot size varys from dot to dot and the Fermi energy does not always lies just in the center between $E_{d+U}$ and $E_d$. In such a case, however, the exchange energy is larger than that in equations (9a) and (9b), and no generality in the following discussion is lost.

The elastic coupling energy $\Gamma$ represents the coupling strength between the conductive electron system and the quantum dot. The $\Gamma$ largely depends on a device configuration such as the distance between the conductive electron system and the quantum dot and a height(strength) of a potential barrier between those. If the elastic coupling energy is too small, then the exchange energy tends to decrease. In this sense, the elastic coupling energy may be preferably as large as possible. However, on the contrary, if the coupling strength between the conductive electron system and the quantum dot is excessively large, the electron cannot be confined in the quantum dot. Thus, we cannot use the assumption of the second-order perturbation from which the equations (2) is derived.

In this respect, it is known that the quantum dot containing the odd number of electrons behaves like a magnetic impurity. According to studies of the Kondo's effect for a single quantum dot coupled to the conductive electron system, it has been known that a optimum value of $\Gamma/\pi U$ takes approximately 0.1. Although a Coulomb energy U is determined at a certain value in inverse proportion to a size of the quantum dot, an elastic coupling energy $\Gamma$ can be freely increased by lowering or thinning down the barrier. It has also been verified that such control of a thickness of the barrier enables adjustment of a device structure to allow $\Gamma/\pi U$ to take an optimum value of 0.1 (see Non-patent literature 1: van der Wiel et al., "The Kondo Effect in the Unitary Limit", Sience Vol. 289, pp. 2105-2108 (2000)). In particular, by shortening a crystal growth time during fabrication of the barrier layer or by fabricating a thin barrier layer, the thickness of the barrier is readily adjusted.

Therefore, using the optimum value of 0.1 for the value of $\Gamma/\pi U$, the equations (9a) and (9b) are respectively calculated as $$J_{RKKY}^{3D}(R) = 8.04\, E_F F_{3D}(2k_F R), \qquad (10a)$$

$$J_{RKKY}^{2D}(R) = 16.08\, E_F F_{2D}(2k_F R). \qquad (10b)$$

Figure 11:
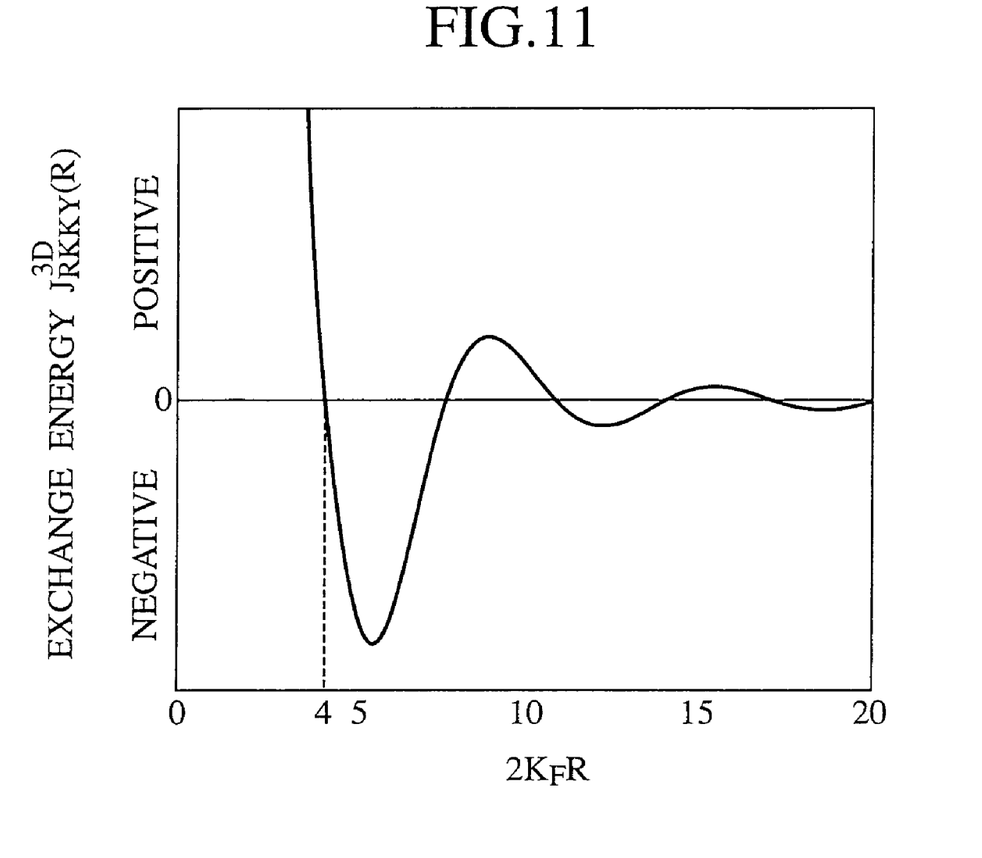
FIG. 11 is a graph showing a strength (exchange energy) of the RKKY interaction as a function of a center-to-center distance between the nearest localized spins.

FIG. 11 is a graph showing the strength of the RKKY interaction in three-dimension as a function of a center-to-center distance (a center-to-center distance between the nearest quantum dots) R between the localized spins. According to this figure, if the center-to-center distance R between the localized spins is less than or equal to approximately $1/\pi$ times the Fermi wave length $\lambda_F$ (here $\lambda_F = 2\pi k_F$, in that a value of $2 k_F R$ in FIG. 11 corresponds to approximately 4), the exchange energy (see the equation (9a)) is positive, (namely, in this situation, the negative interaction aligning the localized spins acts). In the meanwhile, if the center-to-center distance R becomes greater than approximately $1/\pi$ times the Fermi wave length $\lambda_F$, the exchange energy decays while oscillating with the positive and negative amplitudes. Also, the RKKY interaction in two-dimension exhibits a similar oscillating structure.

Thus, one of conditions, that allow non-magnetic material of the present invention to show ferromagnetism, should satisfy that the center-to-center distance R between the nearest quantum dots is greater than a size L of the quantum dot (0<L) and less than or equal to $1/\pi$ times the Fermi wave length $\lambda_F$ of the electron in the conductive electron region ($R \leq \lambda_F/\pi$). That is, the center-to-center distance R between the nearest quantum dots should satisfy the inequality: $0 < L < R \leq \lambda_F/\pi$. In other words, it is concluded that in order to allow non-magnetic material of the present invention to show ferromagnetism, a lower limit ($R_{ll}$) of the center-to-center distance R of the nearest quantum dots needs to be larger than the size L of the quantum dot along a direction in which the electrons are confined and the upper limit ($R_{ul}$) of the center-to-center distance R of the nearest quantum dots is equal to approximately $1/\pi$ times the Fermi wave length $\lambda_F$ of the conductive electron.

Further, the center-to-center distance R between the nearest quantum dots and the size L of the quantum dot along the direction in which the electrons are confined can fluctuate in the range that satisfies the above-described inequality. Here, the "size L of the quantum dot" means a length of the direction in which the electrons are confined.

Figure 12:
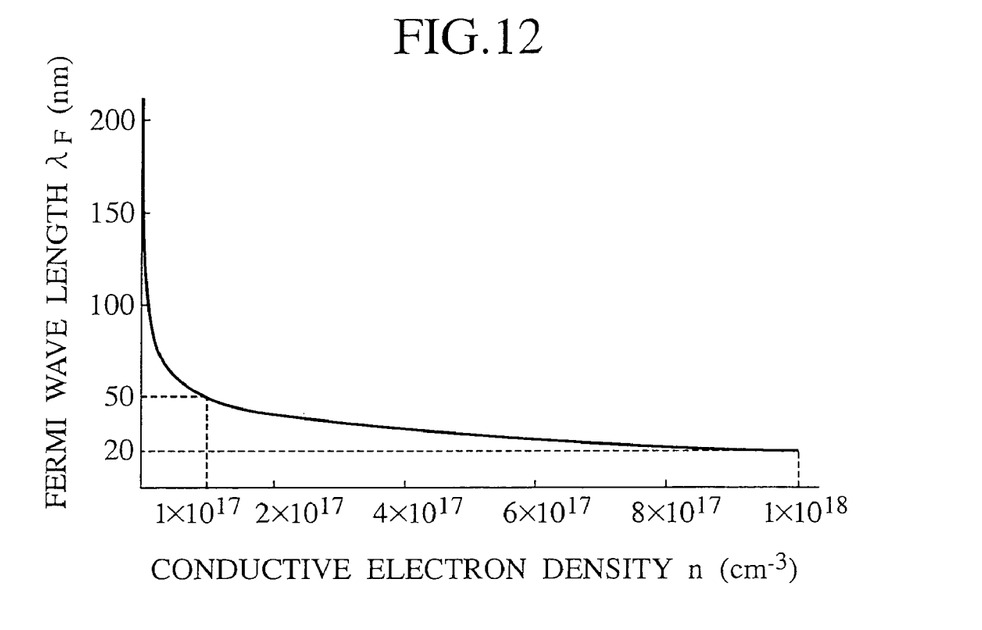
FIG. 12 is a graph showing the relation between Fermi wave length of a conductive electron and conductive electron concentration in a three-dimensional electron system.
Figure 13:
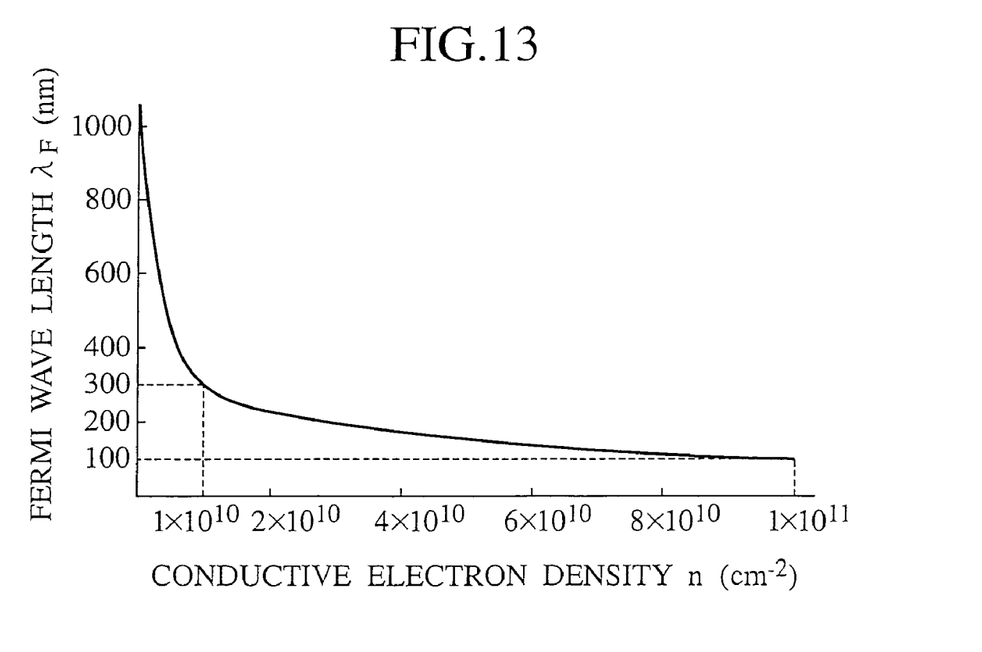
FIG. 13 is a graph showing the relation between Fermi wave length of a conductive electron and conductive electron concentration in case of a two-dimensional electron system.

FIGS. 12 and 13 show the relationships between a Fermi wave length $\lambda_F$ and a conductive electron concentration n of the conductive electron region in terms of a three-dimensional and two-dimensional cases, respectively. Here, a functional form indicated by a solid line is more particularly expressed as $\lambda_F = (2\pi/(3\pi^2 n))^{1/3}$ in case of the three-dimension (see FIG. 12) and expressed as $\lambda_F = (2\pi/(2\pi n))^{1/2}$ in case of the two-dimension (see FIG. 13). In FIGS. 12 and 13, the abscissa indicates a practical range of electron concentration in an actual device. That is, in FIG. 12, the conductive electron density lies in a range greater than approximately $1 \times 10^{17}$ $cm^{-3}$ and less than approximately $1 \times 10^{18}$ $cm^{-3}$ (also similar in FIG. 14), and in FIG. 13, the conductive electron density lies in a range greater than approximately $1 \times 10^{10}$ $cm^{-2}$ and less than approximately $1 \times 10^{11}$ $cm^{-2}$ (also similar in FIG. 15). We see that in FIG. 12, the Fermi wave length $\lambda_F$ associated with the above-described electron concentration lies in a range from approximately 20 nm to approximately 50 nm and in FIG. 13, the Fermi wave length $\lambda_F$ associated with the above-described electron concentration lies in a range from approximately 100 nm to 300 nm.

As described above, $1/\pi$ times the Fermi wave length $\lambda_F$ (that is, $\lambda_F/\pi$) determines the upper limit ($R_{ul}$) of the center-to-center distance R between the nearest quantum dots. Accordingly, in order to allow non-magnetic material of the present invention to show ferromagnetism, in case of the three-dimension the upper limit $R_{ul}$ of the center-to-center distance R between the nearest quantum dots needs to lie at a range from approximately 7 nm (that is, $20/\pi \approx 7$ nm) to approximately 20 nm ($\approx 50/\pi$ nm) in dependence on the electron concentration n of the conductive electron region. Similarly, it is seen that in case of the two-dimension, the upper limit ($R_{ul}$) of the center-to-center distance R between the nearest quantum dots needs to lie at a range from approximately 30 nm (that is, $100/\pi \approx 30$ nm) to approximately 100 nm (that is, $300/\pi \approx 100$ nm) in dependence on the electron concentration n of the conductive electron region.

In the above description, the conductive electron concentration has been limited in the range from $1 \times 10^{17}$ $cm^{-3}$ to $1\times10^{18}$ cm$^{-3}$ (from $1\times10^{10}$ cm$^{-2}$ to $1\times10^{11}$ cm$^{-2}$) in FIG. 12 (FIG. 13). In real devices, the electron concentration may be higher than those values. In this case, the lower limit of the center to center distance R may be lower than 7 nm (or 30 nm).

Further, as described above, the size L of the quantum dot in the direction in which the electrons are confined need to be less than the center-to-center distance R between the nearest quantum dots (L<R). If the upper limit $R_{ul}$ of the center-to-center distance R between the above-described nearest quantum dots is approximately 7 nm, then the size should more preferably be less than 7 nm. Also, if the upper limit $R_{ul}$ of the center-to-center distance R between the above-described nearest quantum dots is approximately 20 nm, the size should more preferably be less than 20 nm. Similarly, in case of the two-dimension, if the upper limit $R_{ul}$ of the center-to-center distance R between the above-described nearest quantum dots is approximately 30 nm, the size should more preferably be less than 30 nm. Likewise, if the upper limit $R_{ul}$ of the center-to-center distance R between the above-described nearest quantum dots is approximately 100 nm, the size should more preferably be less than 100 nm. If these conditions are satisfied, the size L of the quantum dot along the direction in which the electrons is confined can fluctuate.

The functional forms shown in FIGS. 12 and 13 do not depend upon non-magnetic materials (that is, Group III-V materials and Group II-VI materials which are described below) from which the conductive electron region is formed. The ferromagnetic transition temperature is given by the following equation:

$$T_C = 2JzS(S+1)/3 \sim J \qquad (11)$$

where J represents the exchange energy in the formulae (9a) and (9b), z represents the number of the nearest quantum dots, and a symbol "~" indicates that $T_c$ depends on the lattice structure. For instance, in case of a cubic lattice, when substituting z=6 and S=½, it means that $T_c$ takes an order of J (a value approximately several times a value of J).

Figure 14:
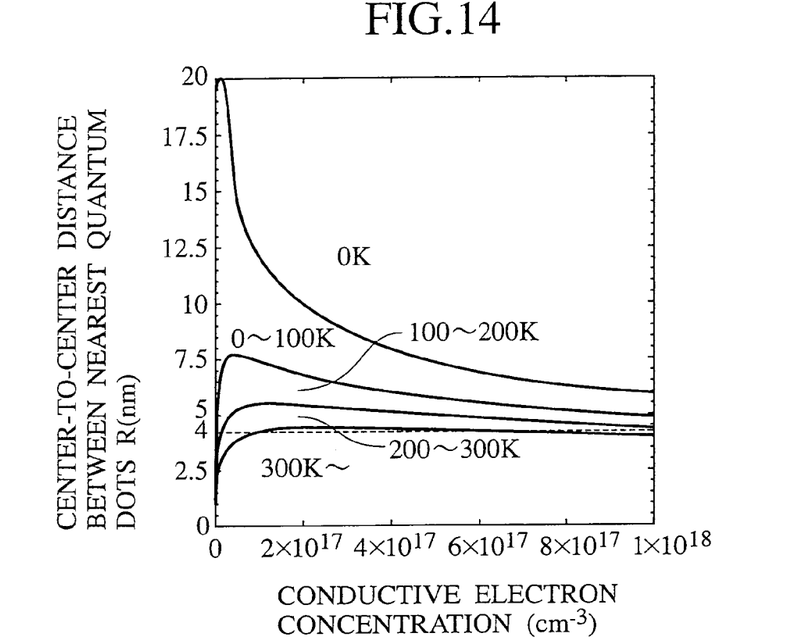
FIG. 14 is a graph showing ferromagnetism transition temperature as a function of a center-to-center distance between the nearest quantum dots and conductive electron concentration in a three-dimensional electron system.
Figure 15:
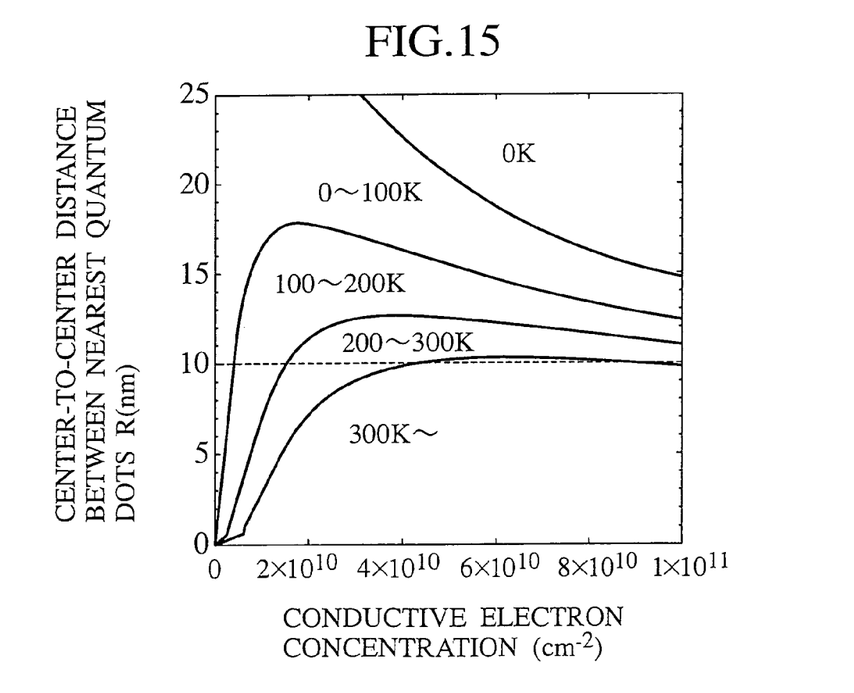
FIG. 15 is a graph showing ferromagnetism transition temperature as a function of a center-to-center distance between the nearest quantum dots and conductive electron concentration in a two-dimensional electron system.

FIGS. 14 and 15 are graphs showing ferromagnetic transition temperatures in cases of the three-dimension and the two-dimension as a function of a conductive electron concentration n and a center-to-center distance R between the quantum dots when the conductive electron region is made from GaAs. From the graphs, whole practical range of electron concentration in the actual device shown in the above-described horizontal axis, it is possible to have the ferromagnetic transition temperature above 300 K (at a room temperature) if, in case of the three-dimension, the center-to-center distance R between the nearest quantum dots is less than or equal to approximately 4 nm (that is, the upper limit $R_{ul}$ of the center-to-center distance R between the nearest quantum dots is about 4 nm), and if in case of the two-dimension, the center-to-center distance R between the nearest quantum dots is less than or equal to approximately 10 nm (that is, the upper limit $R_{ul}$ of the center-to-center distance R between the nearest quantum dots is about 10 nm). From this, in order for ferromagnetism to emerge at the room temperature in the present model based on the RKKY interaction, the center-to-center distance R between the nearest quantum dots needs to be further less than a value $1/\pi$ times the Fermi wave length $\lambda_F$. More specifically, as shown in FIG. 14, in case of the three-dimension, the center-to-center distance R between the nearest quantum dots needs to be less than or equal to a value approximately ⅕ times the Fermi wave length $\lambda_F$. Similarly, as shown in FIG. 15, in case of the two-dimension, the center-to-center distance R between the nearest quantum dots needs to be less than or equal to a value approximately 1/10 times the Fermi wave length $\lambda_F$. In the above description, although we take GaAs for instance in order to explain the ferromagnetic transition temperature, the above-described condition for emerging ferromagnetism at a room temperature is satisfied in other materials (Group III-V materials and Group II-VI materials which will be described below)

Similarly, in order for the above-described magnetic body to show ferromagnetism at the room temperature, the size L of the quantum dot along the direction in which the electrons are confined is preferably less than 4 nm, in case of the three-dimension, and 10 nm in case of the two-dimension.

In has been known for a long time that the RKKY interaction acts between magnetic impurities when nonmagnetic metals, such as copper and aluminum, contain magnetic impurities such as iron (Fe) and manganese (Mn). However, since in these metallic alloys the magnetic impurities are randomly arranged in the lattice points of mother metals, a direction of an internal magnetic field interacting spins of one magnetic impurity depends on a distribution of magnetic impurities in the mother metals. Thus, since it is hard to control positions of such magnetic impurities, as the result it is extremely hard to technologically control the spin location of the metallic alloy.

Further, since the Fermi wave length of metal is extremely small to lie in a value ranging approximately from 0.1 nm to 1 nm, in a real device made by a current technology, the RKKY interaction continues to rapidly decays oscillating with positive and negative signs with increasing the distance between the spins, and the internal magnetic field, acting on individual magnetic impurities, tends to fluctuate in magnitude. Since no control of the size of the internal magnetic field acting on such magnetic impurities can be performed, it is extremely hard to technologically control the spin layout in the metallic alloy.

On the contrary, if the localized spins within the quantum dot, formed of non-magnetic material, are subjected to the RKKY interaction through the conductive electron system, a number of engineering advantages are resulted as described below.

(1) Using a processing technology as well as a self-growing technology, the positions and the size of the quantum dot can be easily controlled.

(2) The use of semiconducting materials having a long Fermi wave length enable the quantum dots having a certain large size to be placed with spaces. For instance, the Fermi wave length of semiconductor materials, such as GaAs and silicon (Si), lies in approximately several tens nm. The quantum dot with such a size has been already easily fabricated. As the size L of the quantum dot along the direction in which the electrons are confined is decreased (to comply with a decrease in the center-to-center distance R between the nearest quantum dots), the ferromagnetic transition temperature increases. Thus, it is preferable to form the smallest dot possible. In a fine processing technology, it has already been undertaken to form the quantum dot with a size less than 10 nm and, a self-growing quantum dot of GaAs or Si has already been realized with a size less than 10 nm (see Non-patent literature 2: Ueno et al., "Fabrication of GaAs Quantum Dots on a Bilayer-GaAs Terminated Si (lll) Substrate", Japan Journal of Applied Physics, Vol. 40, pp. 1888-1891 (2001) and Non-patent literature 3: Oda et al., "Nanocrystalline silicone quantum dots prepared by VHF plasma-enhanced chemical vapor deposition", Japan Journal of Applied Physics", Journal of Physics IV France, Vol. 11, pp. 1065-1071 (2001)). Accordingly, the use of the above-described semiconductor materials enables even the current technology to allow the quantum dots to be adequately placed in arrangement with a spacing less than the Fermi wave length. This enables the RKKY interaction to be negative, thereby enabling exchange interaction to act on the localized spins within the quantum dot to allow ferromagnetism to emage.

(3) Using semiconductor materials, including non-magnetic material, as the conductive electron system, adjusting the conductive electron concentration through application of a gate voltage across gate electrodes enables the Fermi wave length to be further appropriately adjusted with respect to the quantum dot distance, and ferromagnetism can be freely and controllably switched on or switched off.

(4) Since there is no need to include magnetic metallic materials, magnetic material using only nonmagnetic semiconductor materials can be realized. This makes it possible for a magnetic device to be built in a silicon integrated circuit in a monolithic fashion using, for instance, an existing silicon LSI process.

(5) No quantum dot array is required to be uniformly and periodically arranged unlike the flat band ferromagnetic body. If the nearest quantum dots are closer to one another in a distance less than or equal to $1/\pi$ times the Fermi wave length, the center-to-center distance between the quantum dots and the size of the quantum dot can fluctuate to some extent. That is, in case of a flat band ferromagnetic model, the electron needs to directly jump between the quantum dots, that are periodically arrayed, and the energy of the electron needs to have the flat band structure, whereas in the RKKY interaction model that forms a theoretical base of the present invention, it suffices for the electron to indirectly jump between the quantum dots through the conductive electron system. Therefore, a quantum dot array does not have to be periodically arranged. That is, the mechanism in which ferromagnetisms emerge in the RKKY interaction model is essential different from that of the flat-band structure model. The reason why, in the present invention, the variations are allowed to some extents in size of the quantum dot and the center-to-center distance between the quantum dots result from the property of the RKKY interaction.

(6) While, in the above discussion, we consider the situation that the quantum dot contains the odd number of electrons, quantum dot with an even number of electrons may be partly formed because of the size fluctuation. However, the quantum dot with such an even number of electrons merely serves as the "nonmagnetic impurity" with a spin of zero, no adverse affect acts on the magnetic property as a whole. Accordingly, in the RKKY interaction model, which is the theoretical base of the present invention, if the size L of the quantum dot is even less than approximately $1/\pi$ times the Fermi wave length $\lambda_F$ (more preferably, approximately $\frac{1}{5}$ times $\lambda_F$ in case of the three-dimension and approximately $\frac{1}{10}$ times $\lambda_F$ in case of the two-dimension), it is advisable that there is no need for controlling more strictly than that.

(7) Since the ferromagnetic transition temperature depends upon the Fermi energy of the conductive electron of the conductive electron region (see the formulae (10) and (9a), (9b)), ferromagnetism can be raised up to the room temperature.

(8) According to the present invention based on the RKKY interaction, since ferromagnetism can be exhibited at the room temperature not only in the semiconductor quantum dot but also a semiconductor cluster, a carbon cluster and a metallic cluster, of non-magnetic property, formed by using such as a processing technology, a growing technology, a synthesis technology and more, completely new magnetic material comparing to the magnetic body composed of the related art magnetic material can be realized.

The advantages set forth above are of those which can not be seen in the related art metallic magnet body and, in this respect, the magnetic body formed by using the quantum dot composed of non-magnetic material is highly expected in development of a possibility of completely new engineering applications.

Now, an embodiment of the present invention constructed on the basis of the Theoretical Background set for above is described.

First Embodiment

Figure 1:
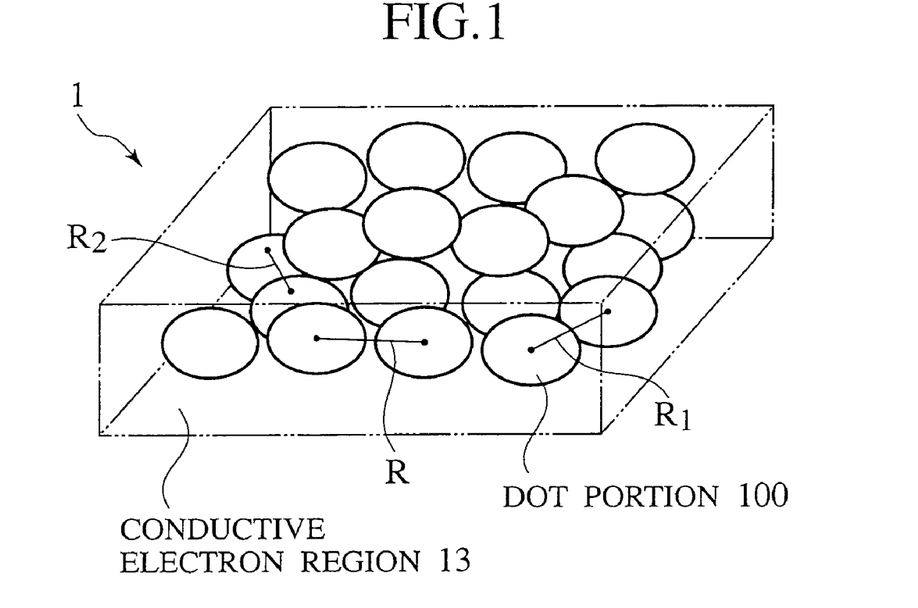
FIG. 1 is an illustrative view showing a structural example of a magnetic body of a first embodiment according to the present invention.
Figure 2:
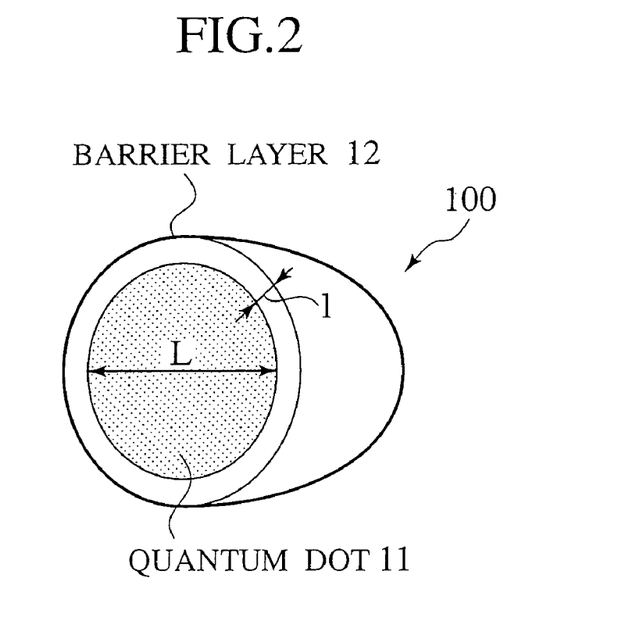
FIG. 2 is an illustrative view showing a structure of a dot portion of FIG. 1.

FIG. 1 is an illustrative view showing a structure of a magnetic body of a first embodiment of the present invention. Further, FIG. 2 is an illustrative view showing a structure of a dot portion 100 of FIG. 1. As shown in these figures, a magnetic body 1 has a structure in that a plurality of quantum dots 11, which forms a localized electron region having a localized spin, in which at least one electron is confined, are buried intervening the dot portion 100, surrounded by a barrier layer (a barrier potential region) 12 by which the electron is confined in each quantum dot 11, in a conductive electron region 13, composed of a conductive electron system, which has a lower energy than that of the barrier layer 12.

Also, it is not objectionable for magnitudes of energies of the quantum dots 11 of the electron localized region and the conductive electron region 13 to lie at arbitrarily values.

Further, the relationships among the quantum dot 11, the barrier layer 12 and the conductive electron region 13 may be similar to those of the structures of other embodiments described below.

In this embodiment, the magnetic body 1 may be preferable if it takes the form of a structure in which the electron is trapped in a fine region with a size L of the quantum dot 11 of a value ranging from approximately several nm to 100 nm. More particularly, as described above in connection with the theoretical background, in case of the three-dimension, the size L of the quantum dot 11 is more preferable to be less than approximately 20 nm as shown in FIG. 12. Further, as shown in FIG. 14, for the purpose of allowing ferromagnetism to show at the room temperature, the size L of the quantum dot 11 is more preferable to be less than approximately 4 nm. In case of the two-dimension, as shown in FIG. 13, the size L of the quantum dot 11 is more preferable to be less than approximately 100 nm. Further, as shown in FIG. 15, for the purpose of allowing ferromagnetism to show at the room temperature, the size L of the quantum dot 11 is more preferable to be less than approximately 10 nm.

As materials of the quantum dot 11 it is conceivable that these materials include Group III-V materials (for instance, non-magnetic materials such as, GaAs, InAs, InGaAs, GaN and InGaN or the like) composed of Group III elements such as, for instance, gallium (Ga), aluminum (Al) and indium (In) and Group V elements, such as nitrogen (N), phosphorous (P), arsenic (As) and antimony (Sb), in combination, and Group II-VI materials (non-magnetic materials such as ZnS, ZnSe, CdSe, HgTe and CdHgTe or the like) composed of Group II elements, such as zinc (Zn), cadmium (Cd) and Mercury (Hg), and Group VI elements such as sulfur (S), selenium (Se) and tellurium (Te), in combination.

The quantum dot 11 can be formed by preparing a fine semiconductor region using, for instance, a processing technique with the use of ion and electron beams and a selective growing technology. Also, by allowing the electrons to be trapped in a semiconductor quantum well structure, the quantum dot 11 may be formed. Additionally, self-growing method may be considered which, through utilization of a semiconductor crystalline growing method using a Volmer-Weber mode, a Stranski-Krastanov mode, a Frank-van der Merve mode and a growing mode resulting from stress caused by a difference in lattice constants, fine quantum dot islands (aggregation of a large number of quantum dots) are naturally grow up in a self-aggregating and self-organizing capabilities to cause a resulting quantum dot island to be coupled to the conductive electron system 13 through the barrier layer 12.

With such a magnetic body 1 thus structured in a manner set forth above, since the quantum dot 11 is coupled to the conductive electron region 13 through the barrier layer 12, the electrons trapped in the quantum dot 11 is able to transfer through the barrier layer 12 due to a tunneling effect and to move into or away from the conductive electron region 13. If the thickness of the barrier layer 12 is excessively large, the electrons undergoes an inability to transfer whereas if the thickness of the barrier layer 12 is too small, the trapping effect of the quantum dot is weakened and, in both cases, the ferromagnetic transition temperature is liable to be lowered. Therefore, by suitably adjusting conditions for growth, synthesis or processing during formation of the quantum dot 11, the barrier layer 12 needs to formed in an optimum thickness. Also, here, the optimum thickness means a thickness in which $\Gamma/\pi U$ lies at a value of approximately 0.1 and takes the maximum value of approximately 1. If $\Gamma/\pi U$ exceeds 1, then, it becomes hard for the electron to be trapped in the quantum dot 11.

The thickness I of the barrier layer to allow $\Gamma/\pi U$ to lie at an optimum value of approximately 0.1 is extremely smaller than the size L of the quantum dot. For instance, when we assume the potential of the barrier layer as a rectangular shape, a wave function of the electron in the quantum dot extends to an outside of the barrier layer in an exponential function relationship. Through calculation in a quantum mechanics, the length d of this extention is given by $$d = \frac{h/2\pi}{\sqrt{8mV}}, \quad (12)$$

where h is the Plank's constant, m is an effective mass, and V is a height of a barrier potential measured in terms of the Fermi energy.

When the length d of this extention is approximately equal to the thickness I of the barrier layer, the electron is trapped and, thus, able to recognize to be an optimum thickness to enable coupling with the conductive electron system. To consider semiconductor material (for instance, AlGaAs and $SiO_2$) to be used as the barrier layer, a height of the barrier potential equals to approximately V=1 eV (electron volt). When using m=0.1 $m_0$ ($m_0$ is a mass of the electron), a thickness of the barrier layer equal to d (I)=0.3 nm. Consequently, by suitably adjusting crystalline growth and processing conditions such that the thickness of the barrier layer reaches a value of approximately 0.3 nm, it is possible to set $\Gamma/\pi U$ to an optimum value. Moreover, for instance, by suitably reducing a composition of Al in AlGaAs, even the height V of the barrier potential is lowered (or the thickness of the barrier layer is increased), enabling $\Gamma/\pi U$ to be set to an optimum value As set forth above in conjunction with the theoretical background, when designing to allow the center-to-center distance R between the nearest quantum dots 11 to be less than a value of approximately $1/\pi$ of the Fermi wave length (more preferably, less than a value $1/5$ times the value of $\lambda_F$ in case of the three-dimension and a value $1/10$ times the value of $\lambda_F$ in case of the two-dimension), ferromagnetic exchange interaction acts between the localized pins in the quantum dot 11, thereby causing spin polarization to be induced in the conductive electron region 13.

Also, while in FIG. 1, the dot portions 100 have been shown as being irregularly arranged (for instance, $L<R_1 \neq R_2 \leq R_{ul}$), this reflects that a limitation exists in an accuracy in a current processing technology. However, according to the present invention, as set forth, it is possible to allow the variation in the distance between the quantum dot portions 100, it can be said that a capability of forming the magnetic body which can sufficiently show ferromagnetism even under such a restricted condition in the processing accuracy provides a feature that can be emphasized.

In actual practice, as described above with reference to the theoretical background, when structuring the magnetic body of the presently filed embodiment, it is the most important point to design that the center-to-center distance R (involving $R_1$ or $R_2$) between the nearest quantum dots 11 becomes larger than the size L of the quantum dot and less than a value approximately $1/\pi$ times the Fermi wave length. Additionally, in order to allow ferromagnetism to show event at the room temperature, it is preferable to design such that the center-to-center distance R between the nearest quantum dots 11 becomes larger than the size L of the quantum dot and less than a value approximately $1/5$ times (in case of the three-dimension) or $1/10$ times (case of the two-dimension) the Fermi wave length.

Under such a condition, in the present invention, the variations in the center-to-center distance R between the nearest quantum dots and the size L of each quantum dot 11 are enabled to be tolerated, respectively, within ranges that satisfy the ranges which have been described in detail with reference to the theoretical background. This mean that it is possible to manufacture the magnetic body 1 from the semiconductor of non-magnetic material without causing each quantum dot 11 to be formed in a particular lattice arrangement. Accordingly, when manufacturing the magnetic body 11 of the present invention, it is advantageous in that a semiconductor magnetic body 1 can be manufactured with no need to perform control at a particular high level.

Further, although all of the dot portions 100 shown in FIG. 1 (and in FIG. 2) have been shown as having the same configurations, this is merely for the sake of convenience in describing the drawings and, in actual practice, it is of course to be understood that the respective dot portions 100 are formed in various shapes, respectively.

Moreover, the shape of the magnetic body 1 should not be limited to a particular cubic structure shown in FIG. 1. In FIG. 1, because of a primary object aiming to describe the structure of the essential part of the magnetic body 1, although a whole configuration has been shown and described in a simple cubic structure, in actual practice, the magnetic body 1 may be possibly processed in various shapes. This teaching can also be similarly applied to other drawings illustrating structures of other magnetic bodies that will be described below.

In the presently filed embodiment, it is possible to structure various magnetic bodies having the same benefits as those of the magnetic body 1. Hereinafter, an explanation is shown below in respect of a structural example of such a magnetic body. Also, it is to be noted that the size of the quantum dot forming the magnetic body nearly equals that of the quantum dot 11.

Figure 3:
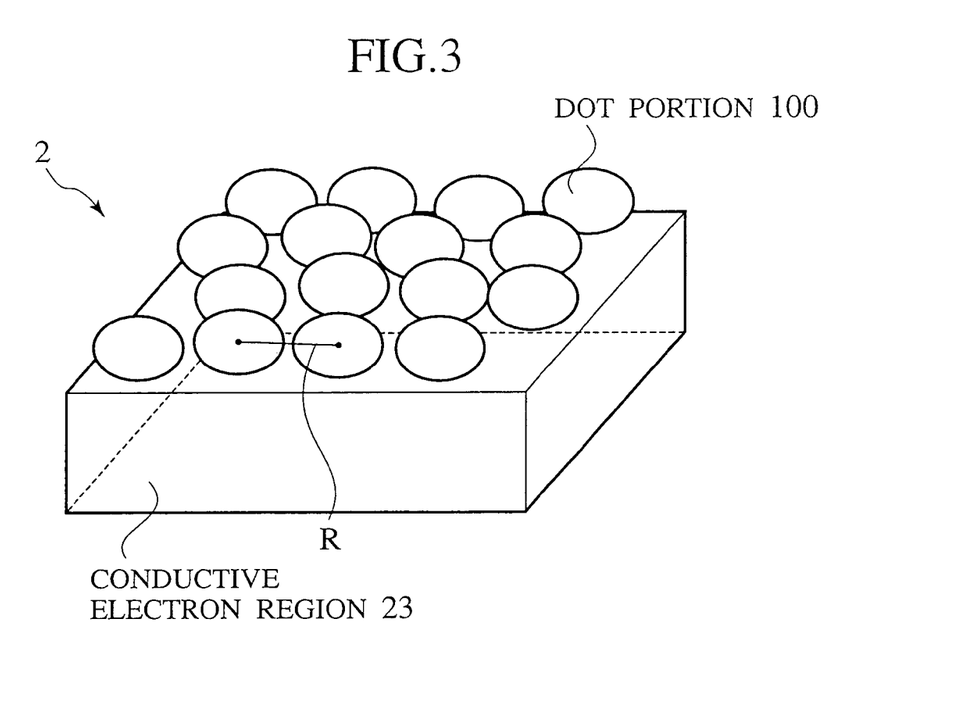
FIG. 3 is an illustrative view showing a second structural example of the magnetic body of the first embodiment according to the present invention.

FIG. 3 is an illustrative view showing a structure of a magnetic body 2 wherein dot portions 100, each of which includes a quantum dot with an outer side periphery thereof surrounded by a barrier layer, are placed onto an upper area of a conductive electron region 23 in contact therewith. The respective dot portions 100 (each composed of the quantum dot and the barrier layer) shown in the figure is formed in the structure as shown in FIG. 2.

Figure 4:
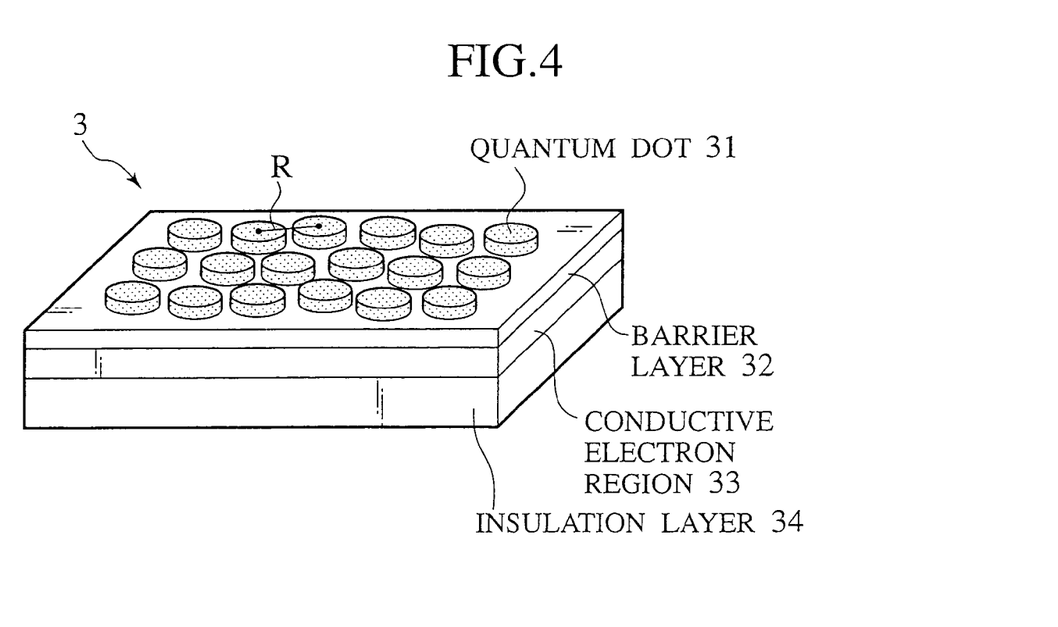
FIG. 4 is an illustrative view showing a third structural example of the magnetic body of the first embodiment according to the present invention.

FIG. 4 is an illustrative view showing a structure of a magnetic body 3 wherein a barrier 32 is formed over a conductive electron region 33 and, further, placed on the barrier layer 32 are quantum dots 31. In this figure, formed beneath a lower layer of the conductive electron region 33 is an insulation layer 34.

Figure 5:
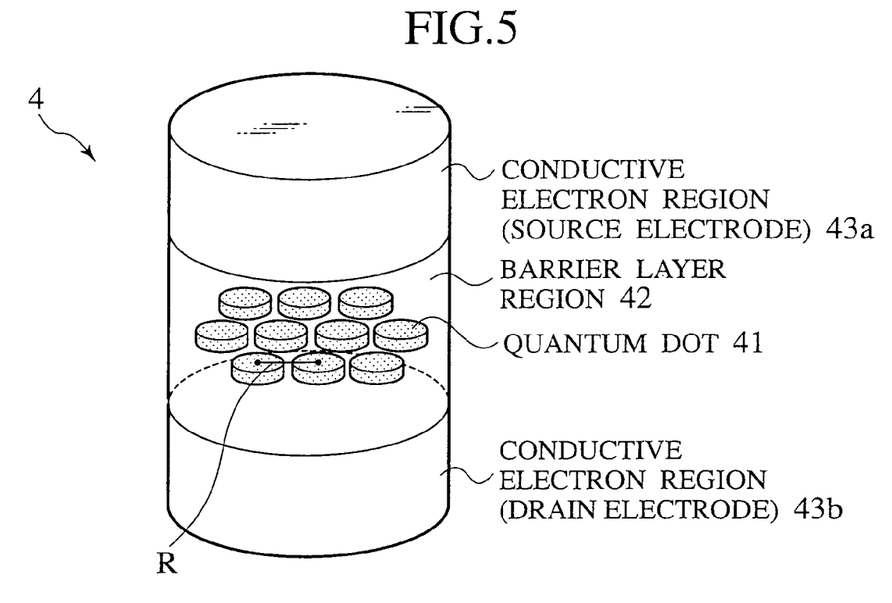
FIG. 5 is an illustrative view showing a fourth structural example of the magnetic body of the first embodiment according to the present invention.

FIG. 5 is an illustrative view showing a magnetic body 4 having a structure with a layout wherein upper and lower conductive electron regions 43a and 43b are disposed so as to sandwich a barrier layer 42 in which quantum dots 41 are burried. With the magnetic body 4 shown in this figure, the conductive electron regions 43a and 43b play roles as a source electrode and a drain electrode, respectively, enabling electric current to flow across the source and drain electrodes through the quantum dots that are burried.

As described above, since the magnetic body composed of non-magnetic material of the first embodiment of the present invention includes the localized electron region (the quantum dot) in which the electrons are trapped, the barrier potential region (the barrier layer) in close contact with the localized electron region and having the higher energy potential than that of the localized electron region, and the conductive electron region with the lower energy potential than that of the barrier potential region to allow the electrons to transfer to and from the localized electron region via the barrier potential region, it is possible to show ferromagnetism at a room temperature.

In general, it is not obvious that a large number of quantum dot arrays exhibits ferromagnetism even at the room temperature. According to the present invention, through the use of quantum dot arrays constructed on the basis of the theory of the RKKY interaction, it becomes possible to provide a magnetic body that exhibits ferromagnetism even at the room temperature.

Further, since the magnetic body of the presently filed embodiment can be formed using an existing processing technology, a growing technology and a synthesis technology, the magnetic body takes advantage of the capability to be formed on the same substrate with the related art devices such as transistors. By using such a semiconductor dot magnetic body, a remarkable contribution is considered to be made to miniaturization and high integration capabilities of LSI chips whose future developments are highly expected.

Furthermore, according to the presently filed embodiment, due to an ability of the semiconductor being applied with the voltage across the gate electrodes to cause the conductive electron concentration to be freely varied, the ferromagnetic can be easily and controllably switched on or switched off and can be used as a magnetic switching device or a magnetic sensor.

In addition, it is possible for the semiconductor to easily vary the degree of electron transfer and the quantum dot configuration, it is considered that magnetic body can be fabricated in an extremely favorable controllability.

Also, according to the present invention based on the RKKY interaction, since ferromagnetism can be exhibited at the room temperature not only in the semiconductor quantum dot but also a semiconductor cluster, a carbon cluster and a metallic cluster, of non-magnetic property, formed by using such as a processing technology, a growing technology, a synthesis technology, and more, completely new magnetic material comparing to the magnetic body composed of the related art magnetic material can be realized.

Second Embodiment

Figure 6:
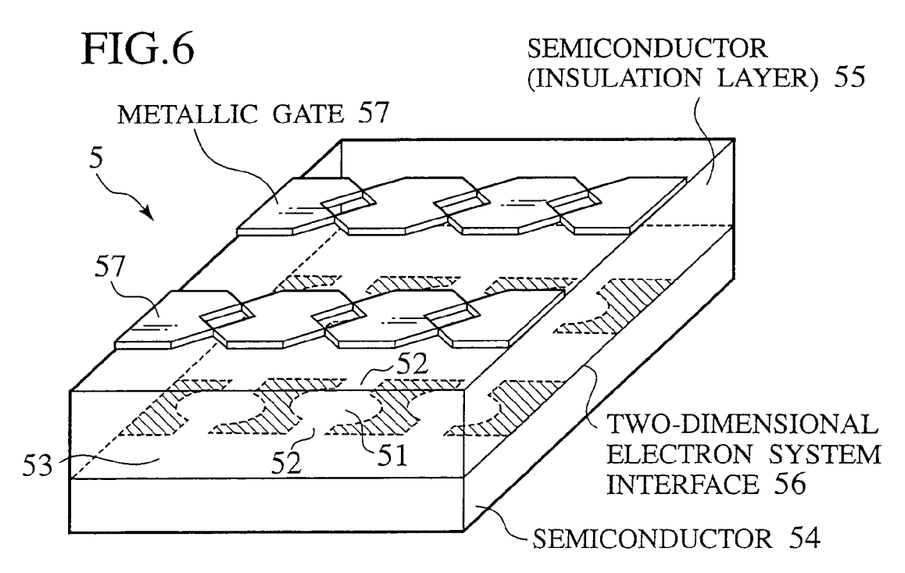
FIG. 6 is an illustrative view showing a structural example of a magnetic body of a second embodiment according to the present invention.

FIG. 6 is an illustrative view showing a structure of a magnetic body of a second embodiment of the present invention. The magnetic body 5 shown in FIG. 6 contemplates the use of two-dimensional conductive electron gas formed in a two-dimensional electron system interface 56 such as a hetero interface of a compound semiconductor composed of GaAs and aluminum-gallium-arsenate (AlGaAs), and an inverted layer of a silicon MOS (Metal Oxide Semiconductor) transistor composed of silicon and silicon dioxide.

While FIG. 6 shows that the two-dimensional electron system interface 56 is formed at a boundary between a semiconductor 54 and a semiconductor 55, in a case where this two-dimensional electron system interface 56 includes the hetero interface of the compound semiconductor set forth above, the semiconductor 54 is composed of GaAs and the semiconductor 55 (the insulation layer) is composed of AlGaAs. In this case, GaAs and AlGaAs may also be reversed. Also, in case of the two-dimensional electron system interface 56 being composed of the inversion layer of the silicon MOS transistor, the semiconductor 54 is made from silicon and the semiconductor 55 (the insulation layer) is made from silicon dioxide.

Also, with respect to the formation method and the material structure of the two-dimensional electron system interface, various other methods may be employed in addition to the above and, strictly, a teaching shown in FIG. 6 is merely an example.

Mounting an external metallic electrode gate (metallic gate) 57, processed in a particular configuration, directly onto an upper surface of the two-dimensional electron system (the conductive electron region) so as to sandwich the semiconductor 55 whereupon a negative voltage is applied to this metallic gate 57 enables an electrostatic potential to increase at an area just below the metallic gate 57, causing the electrons, prevailing in the vicinity of this area on the two-dimensional electron system interface 56, to be excluded (corresponding to half-tone dot meshing areas in FIG. 6). As a result, the electrons are localized inside the two-dimensional electron system interface 56, in which, in addition to the formation of the conductive electron system region 53, the quantum dot region 51 and the barrier layer region 52 are formed.

Figure 7:
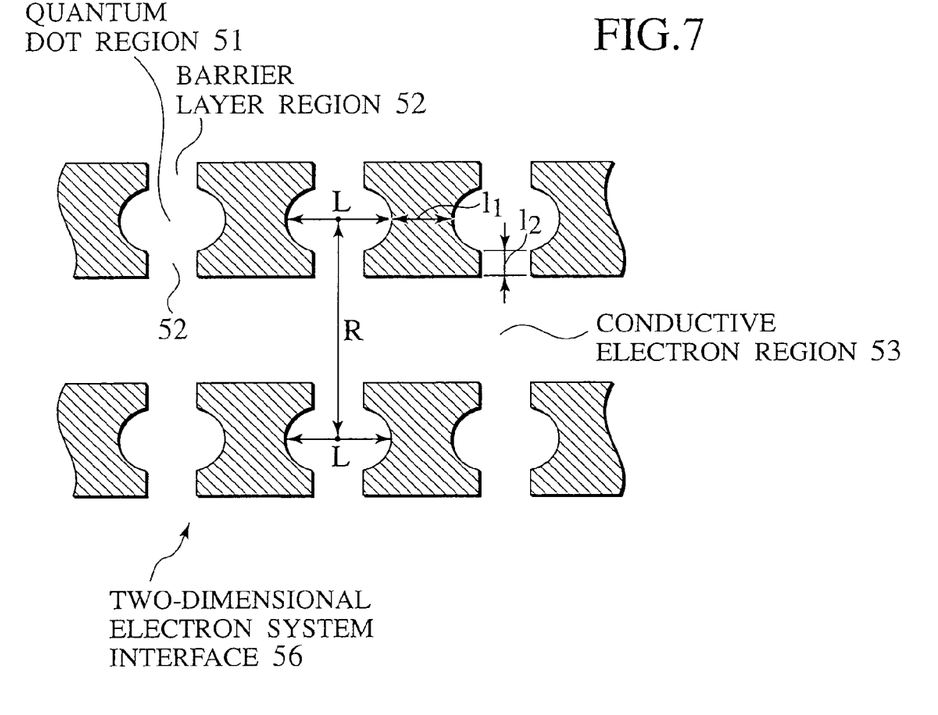
FIG. 7 is an illustrative view showing a structure of a two-dimensional electron system interface of FIG. 6.

FIG. 7 is an illustrative view typically showing the two-dimensional electron system interface 56 when formed with the quantum dot region 51 and the barrier layer region 52 when the metallic gate 57 is applied with the negative voltage. As set forth above, a spacing, size and layout of the quantum dot region 51 are formed in dependence upon the shape of the metallic gate 57 and it is needless to say that the teaching shown in FIG. 7 is strictly one mere example.

Also, the size of the quantum dot region 51 supposed in the presently filed embodiment approximately equals the size of the quantum dot region in the first embodiment described above.

Further, like in the first embodiment set forth above, there may be variations in the center-to-center distance R between the nearest quantum dots and the size L of the quantum dot 11.

With the second embodiment of the present invention set forth above, it is possible to obtain the same advantages as those of the first embodiment.

Third Embodiment

Figure 8:
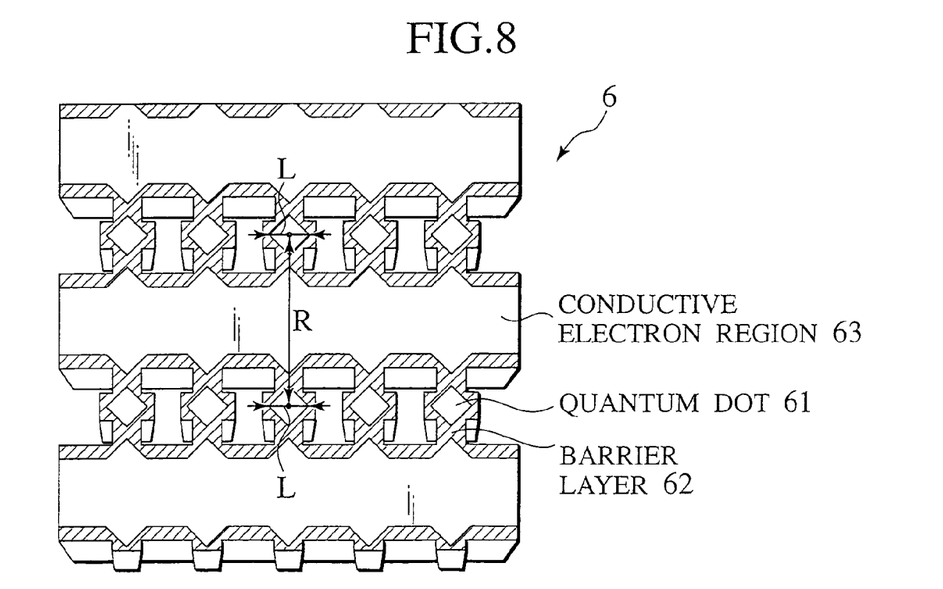
FIG. 8 is an illustrative view showing a structural example of a magnetic body of a third embodiment according to the present invention.

FIG. 8 is an illustrative view showing a structure of a magnetic body of a third embodiment of the present invention. The magnetic body 6 shown in this figure is manufactured applying an etching process method or a selective growing method to a semiconductor. More particularly, when processing a semiconductor to cut out a portion thereof by an etching process to finally form a configuration shown in FIG. 8, electrons transfer depending upon this configuration to allow the electrons to accumulate in a quantum this wire region with its cross section represented in a substantially rhombus shape in the same figure, thereby forming the quantum dot portions 61. Also, the size of the quantum dot region 61 substantially equals the sizes of the quantum dot portions of the first and second embodiments. Further, while in FIG. 8, the cross sectional areas of all the quantum dots 61 that are formed have been shown and described in the substantially same rhombus shape, it is of course to be understood that the quantum dots 61 formed through actual transfer of the electrons have different configurations, respectively.

In such a manner, the conductive electron region 63 of the magnetic body 6 is widely realized within the semiconductor region having a cubic structure and the quantum dots 61 are realized in the quantum thin wire structure prepared by the etching technology and the selective growing method. Also, the barrier layer regions 62 can be realized by fabricating or processing narrow channels between the regions of the quantum dots 61 and the conductive electron region 63.

Also, of course, the magnetic body 6 of the presently filed embodiment can be formed using a pattern-dependent oxidation method (PADOX method: Pattern-Dependent Oxidation) wherein, during oxidizing silicon, a joint portion between a narrow fine wire region and a wide conductive electron region is subjected to further increased oxidation than that of the other portion to allow the barrier layers to be naturally formed at the joint portion.

Further, the configuration shown in FIG. 8 is strictly a mere example and is not limited to such a configuration. When constructing the magnetic body of the presently filed embodiment, it does not matter if any shape is formed, provided that during processing the semiconductor, the quantum dot region and the barrier layer region are suitably constructed.

It is needless to say that the third embodiment of the present invention set forth above has the same advantages as those of the two embodiments discussed above.

Fourth Embodiment

Figure 9:
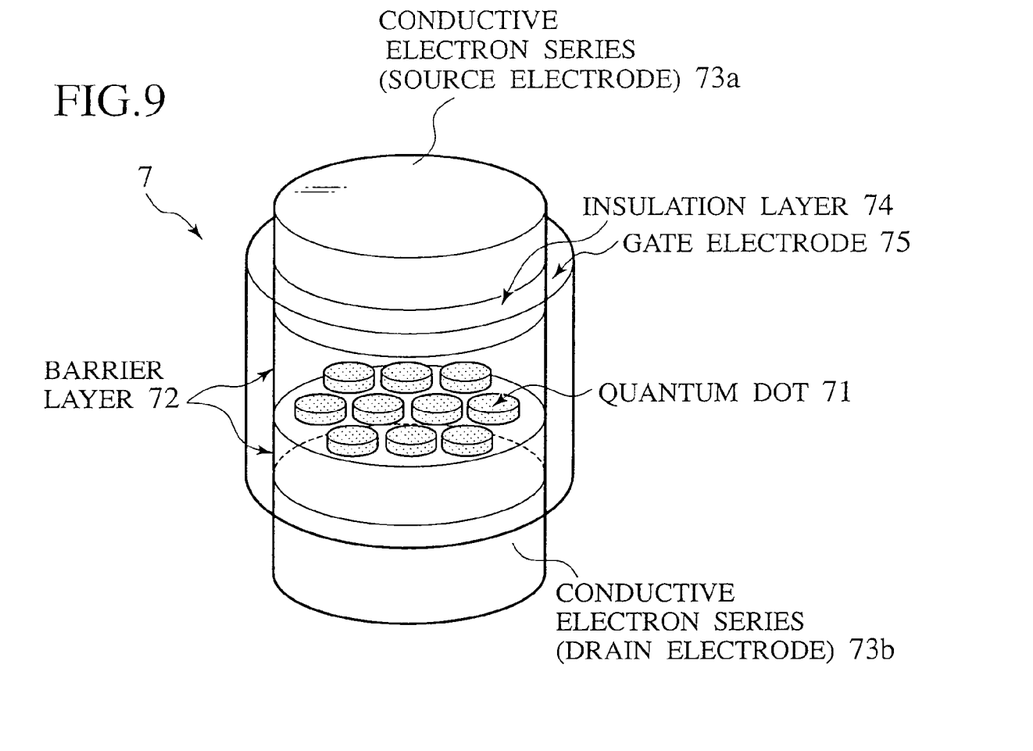
FIG. 9 is an illustrative view showing a structural example of a magnetic device employing the magnetic body of the present invention.

FIG. 9 is an illustrative view showing a structural example of a magnetic body of a fourth embodiment of the present invention. The magnetic body 7 has a structure in which conductive electron regions 73a and 73b are arranged so as to pinch a barrier 72 in which quantum dots 71 are burried. The conductive electron regions 73a and 73b of the magnetic body 7 shown in the figure play roles as a source electrode and a drain electrode and it is possible to allow electric current to flow through the source and drain electrodes via the burried quantum dots. In addition to this, with the presently filed embodiment, the magnetic body 7 includes a structure (with three terminals elements) in which insulation layers 74 and external gate electrodes 75, by which voltages are applied to the conductive electron regions 73a and 73b through the insulation layers 74, that are disposed at outer vicinities of the conductive electron regions 73a and 73b. In this magnetic body 7, applying the voltage to the external gate electrode 75 enables the conductive electron concentrations of the conductive electron regions 73a and 73b to vary in a change. Thus, it becomes possible for the magnetic body 7 to play a role as a three-terminal element that allows the ferromagnetic condition of a portion of the quantum dot array 71 to be freely switched on or switched off with a change with the passage of time.

Figure 10:
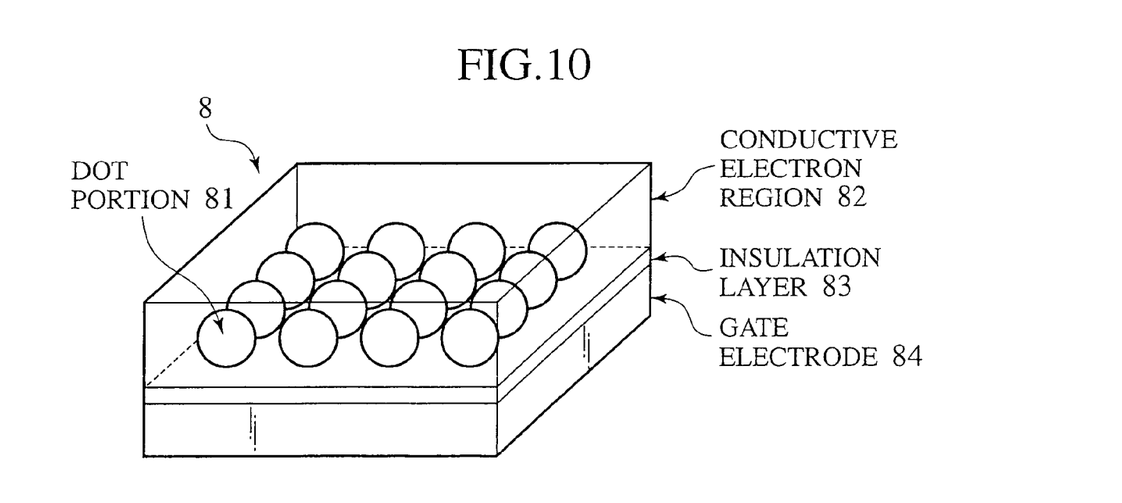
FIG. 10 is an illustrative view showing a second structural example of a magnetic device employing the magnetic body of the present invention.

FIG. 10 is an illustrative view showing a second structural example of a magnetic body of the fourth embodiment set forth above. The magnetic body 8 has a structure that includes a dot portion 81 having a plurality of quantum dots in each of which a plurality of electrons having lower energy potentials than those of circumferences are trapped, a barrier layer with a higher energy potential than the Fermi energies of the electrons forming the quantum dots, and a conductive electron region 82 having a lower energy potential than that of the barrier layer, in which the plural quantum dots are burried with the barrier layers being sandwiched. Further, it is structured such that disposed beneath the conductive electron region 82 is an insulation layer 83, and jointed to the conductive electron region 82 is an external gate electrode 84. By applying a voltage to the external game electrode 84, a conductive electron concentration of the conductive electron region 82 can be varied in a change, making it possible to adjust the Fermi energy of the conductive electron system through the external gate electrode 84. By so doing, the magnetic body 8 is enabled to allow the ferromagnetic condition of the dot portion 81 to be freely switched on or switched off in a change with the passage of time.

In general, if mismatch takes place in lattice constants between the quantum dot and the insulation layer in contact therewith or an anisotropy occurs in a crystalline structure of the quantum dot, a structural anisotropy is created in the quantum dot due to stresses or an anisotropy of the band structure, resulting in a magnetic anisotropy in the spin of the quantum dot. Also, a similar magnetic anisotropy is created when in use of material (such as InAs) with strong spin-orbit interaction as the quantum dot. For this reason, when the quantum dot as a whole has ferromagnetism, the quantum dot is enabled to have a magnetic easy axis oriented in a certain direction. That is, through the use of semiconductor material, the magnetic body can have the same characteristic as that of a metallic magnetic body. For this reason, it is conceived that the magnetic body using only semiconductor material has a wide range of applications to a GMR magnetic head, a magnetic sensor and a non-volatile memory (including MRAM). Not only that, the magnetic body using semiconductor material also has a characteristic that would not appear in the metallic magnetic body. That is, since the Fermi energy of the conductive electron system is easily adjusted with the external electrode, it is possible to switch on or switch off the ferromagnetic condition of the quantum dot array part. The use of this enables the use of material for a spintronics device such as a spin transistor. Further, application to magnetic-optic material enables polarizing rotation of a light to be freely switched on or switched off with an external voltage and new device material to be available. The presently filed embodiment exhibits a typical structural example for such a new device.

It is needless to say that the third embodiment set forth above has the same advantageous effects as those of the three embodiments described above.

Also, the present invention may involve various other forms of the embodiment that provides the same advantages as those of the first to fourth embodiments described above.

Also, although strictly, it is hard to say that no direct jumping between the quantum dot and the quantum dot, in order for direct jumping to take place, it is premised that a coupling energy between the quantum dot and the quantum dot is less than a coupling energy between the conductive electron system and the quantum dot. In this respect, for instance, as shown in FIG. 7, since an attempt is made to take the form of a structure in that a thickness $l_2$ of the barrier between the dot and the dot is surely thicker than a thickness $l_1$ between the conductive electron system and the quantum dot ($l_1 > l_2$), no probability takes place in a drop in the ferromagnetic transition temperature due to direct jumping of the electron between the quantum dot and the quantum dot. This is similarly applied to all of the embodiments described above.

As set forth above, according to the present invention, it is possible to provide a magnetic body, made from non-magnetic material, that exhibits ferromagnetism by coupling the quantum dots, each surrounded by the barrier layer, to the conductive electron region, and that is easy to manufacture. Further, it is possible to provide a magnetic device which makes it possible to freely and controllably turn on or turn off ferromagnetism at a room temperature. Moreover, it is possible to provide a manufacturing method for manufacturing a magnetic body composed of non-magnetic material with no need for control at a high level.

What is claimed is:

1. A magnetic body composed of non-magnetic material, comprising:
   quantum dots, each of which has at least one electron to form a localized spin;
   a barrier potential region having a higher energy than a Fermi energy of an electron in the respective quantum dots and confining the at least one electron within the respective quantum dots; and
   a conductive electron region including a conductive electron system having an energy lower than an energy of the barrier potential region,
   wherein the respective quantum dots are disposed separate from one another via the barrier potential region and the conductive electron region to show ferromagnetism based on an interaction between localized spins through the conductive electron region,
   wherein the quantum dots are spatially arranged in a range that satisfies a condition in which a center-to-center distance between nearest quantum dots is greater than a size of the respective quantum dots along a confinement direction containing the at least one electron and at most $1/\pi$ times a Fermi wave length of a conductive electron of the conductive electron region,
   wherein the respective quantum dots are allowed to have a different size from each other with a fluctuation in a range that the size thereof along the confinement direction containing the at least one electron is less than $1/\pi$ times the Fermi wave length of the conductive electron.

2. The magnetic body according to claim 1, wherein the respective quantum dots are arranged in a three-dimension such that the Fermi wave length of the conductive electron is at most approximately 50 nm.

3. The magnetic body according to claim 1, wherein the respective quantum dots are arranged in a three-dimension such that the center-to-center distance between nearest quantum dots is at most approximately 4 nm, whereby the magnetic body shows ferromagnetism at a room temperature.

4. The magnetic body according to claim 1, wherein the respective quantum dots are arranged in a two-dimension such that the Fermi wave length of the conductive electron is at most approximately 300 nm.

5. The magnetic body according to claim 1, wherein the respective quantum dots are arranged in a two-dimension such that the center-to-center distance between nearest quantum dots is at most approximately 10 nm, whereby the magnetic body shows ferromagnetism at a room temperature.

6. The magnetic body according to claim 1, wherein the respective localized electron regions and the barrier potential region are formed by an electrostatic potential in the two-dimensional conductive electron region at an interface between a semiconductor and an insulation layer when a given voltage is applied to an external gate electrode formed on the insulation layer.

7. The magnetic body according to claim 1, wherein the respective localized electron regions are formed by permitting electrons to be trapped in a quantum wire structure.

8. The magnetic body according to claim 1, wherein the respective quantum dots are composed of one of a semiconductor cluster, a semiconductor cluster, a carbon cluster and a metallic cluster as the non-magnetic material.

9. A magnetic device comprising: a magnetic body including:
   quantum dots, each of which has at least one electron to form a localized spin;
   a barrier potential region having a higher energy than a Fermi energy of an electron in the respective quantum dots and confining an electron within the respective quantum dots; and
   a conductive electron region including a conductive electron system having an energy lower than an energy of the barrier potential region, wherein the respective quantum dots are disposed separate from one another via the barrier potential region and the conductive electron region to show ferromagnetism based on an interaction between localized spins through the conductive electron region, wherein the quantum dots are spatially arranged in a range that satisfies a condition in which a center-to-center distance between nearest quantum dots is greater than a size of the respective quantum dots along a confinement direction containing the at least one electron and at most $1/\pi$ times a Fermi wave length of a conductive electron of the conductive electron region,
   wherein the respective quantum dots are allowed to have a different size from each other with a fluctuation in a range that the size thereof along the confinement direction containing the at least one electron is less than $1/\pi$ times the Fermi wave length of the conductive electron;
   an insulation layer; and
   a gate electrode disposed in close proximity to a conductive electron region of the magnetic body through the insulation layer;
   wherein application of a voltage to the gate electrode allows a ferromagnetic condition of the magnetic body to be controllably turned on or turned off.

* * * * *